FLOW CHARACTERISTICS OF NORMAL BLOWN ASPHALT
AND RECONSTITUTED ASPHALTS WITH P+N AND AO-I
(TIA JUANA MEDIUM CRUDE)
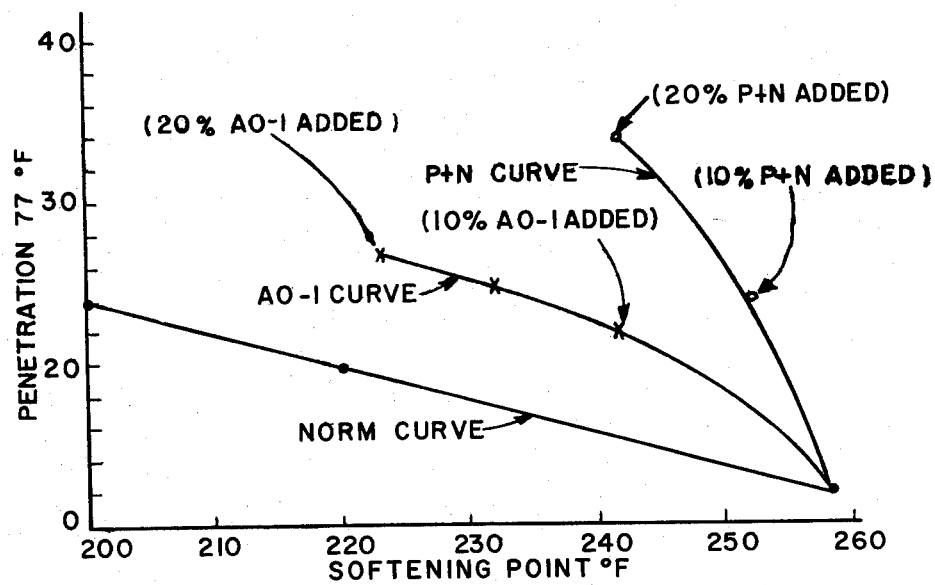
Luke W. Corbett    Inventor
By Richard H. Nagel
Patent Attorney

3,093,573
ASPHALTS OF IMPROVED RESISTANCE TO FLOW
Luke W. Corbett, Westfield, N.J., assignor to Esso Research and Engineering Company, a corporation of Delaware
Filed Dec. 15, 1959, Ser. No. 859,678
3 Claims. (Cl. 208—39)

This invention relates to a process for producing improved asphalt compositions. More specifically, the instant invention teaches the blending of certain defined components of asphalt into asphalt base stock to modify and improve the flow resistance properties.

Asphalts of improved resistance to flow or improved temperature susceptibility are highly desirable in roofing applications. Specifically, these asphalts are useful in the manufacture of roll saturated felts, roll prepared roofing, and prepared roofing shingles. In such applications, improved flow properties impart greater flexibility at lower temperatures, thus providing for more handling ease without fracture or cracking; and longer life or service since all asphalt roofing products harden somewhat with age and weathering. Thus, with improved flow properties to begin with, there will be a prolonging of the useful service of the asphalt products. Improved flow properties also reflect higher resistance to flow under high summer sun temperatures; this decreases the softening point to which the asphalt must be air blown or processed for use in roofing compositions. Flow resistance properties are of advantage in other specialty applications such as in waterproofing and dampproofing wherein the asphalt is used as a membrane or in a membrane composition. Improved flow resistance properties will be of quality advantage here also because in such applications the membrane is frequently submitted to a wide span of ambient temperatures. Examples of this are in above-ground dampproofing types of constructions as specified by American Society for Testing Materials, and in the buried membrane type of irrigation canal construction as designed and specified by the U.S. Bureau of Reclamation.

To clarify the invention, a brief discussion of the composition of asphalt residuum is helpful. By use of Nuclear Magnetic Resonance and conventional analytical test methods such as ebulliscopic molecular weight and ultimate combustion analysis each of five components in asphalt has been characterized structurally. The five asphalt components, only the first two of which are of interest in the instant invention, may be described briefly as follows:

Paraffins plus naphthenes—A mixture of pure paraffins and naphthenes with paraffin side chains.

Aromatic oil #1—A mixture of single ring aromatics with long paraffin side chains plus single ring aromatics with attached naphthene rings.

Aromatic oil #2—A mixture of mono and multiple aryl aromatics with paraffin side chains or attached naphthene rings.

Aromatic oil #3—A mixture similar in structure to aromatic oil #2 but definitely higher in molecular weight, and containing more nitrogen, sulfur and some oxygen.

Asphaltenes—A complex hydrocarbon of highly aromatic nature and high molecular weight, assumed to be a perinaphthalene type structure.

To further define the five components, the following physical properties are given:

TABLE I

| Component | Specific gravity, 60/60° F. | Universal viscosity, 210° F. | Viscosity index | Color |
|---|---|---|---|---|
| Paraffins plus naphthenes. | .86–.90 | 50–125 | 75+ | Water white. |
| Aromatic oil #1 | .91–.95 | 100–300 | 25–100 | Yellow. |
| Aromatic oil #2 | .97–1.03 | 500–1,500 | 25–75 | Yellow to red. |
| Aromatic oil #3 | 1.04–1.08 | 10,000–500,000 | <0 | Black. |
| Asphaltenes | 1.15–1.25 | (¹) | | Black-brown. |

¹ Solid, infusible.

In addition, all of the above components have high initial boiling points of 800+° F. and a relatively high flash point (450+° F. by the Cleveland Open Cup Method).

The average chemical structure of the components is shown in the following table:

TABLE II

| Component | Formula | Mol. wt. | C/H | BI | C/SC | AR |
|---|---|---|---|---|---|---|
| Paraffin plus naphthenes. | $C_{43}H_{87}$ | 600 | 6.2 | .36 | | |
| Aromatic oil #1 | $C_{52}H_{90}$ | 674 | 6.9 | .50 | 13.3 | 1.2 |
| Aromatic oil #2 | $C_{52}H_{84}S$ | 708 | 7.9 | .55 | 6.7 | 5.1 |
| Aromatic oil #3 | $C_{66}H_{94}NSO$ | 956 | 8.4 | .60 | 5.5 | 6.7 |
| Asphaltenes | $C_nH_{2n-6}NSO$ | 3,000 | 10.6 | .75 | 3.1 | |

Branchiness index indicated above by BI is the ratio of methyl to methylene hydrogens exclusive of hydrogens on the alpha carbon. Basically, this is a measurement of the relative amount of hydrocarbon branching. Carbons per side chain (C/SC) sometimes referred to as the chain length is the average number of alkyl carbon atoms per side chain. Any carbon atom substituted on an aromatic ring is considered a side chain. This is a significant measure of the structure of a hydrocarbon as it portrays the length or size of the aliphatic derivative. Aromatic rings per molecule (AR) is the average number of individual unsaturated rings. It identifies the size of the basic aromatic nucleus around which the hydrocarbon structure is built.

A typical coating asphalt, specifically one obtained from a Tia Juana crude, contains the following percentages of the above five components respectively: 18%, 14%, 15%, 19% and 34%.

In accordance with the instant invention, it has been found that by increasing the percentage of the paraffins plus naphthene component and/or the aromatic oil #1 component an asphalt with improved flow properties may be obtained. The amount of these components that should be blended with the base stock may range from 1 to 25% by weight, but preferably 3 to 10%. The exact amount, of course, is dependent on the flow characteristics desired and the base stock used.

The blending of an asphalt using any base asphalt stock, either straight run, air blown or propane precipitated, can be accomplished by straight forward blending in most cases. It has been found that the paraffin plus naphthene and the aromatic oil #1 components blend completely and homogeneously by raising the blend mixture to a temperature in the range of 100° F. to 400° F. and providing a moderate amount of intimate mixing or stirring.

The temperature for mixing depends in general upon the viscosity of the final blend or that of the base asphalt. Softening point is another guide to the proper mixing temperature. It has been found that a mixing temperature of from 100 to 200° F. above the softening point of the blend or base ingredients is desirable to obtain suitable fluidity for blending.

The flow properties of an asphalt can be defined by a number of different test characteristics or empirical relationships well known in the art and technology of asphalt. Two of the most common methods of evaluating flow characteristics are used in the examples to follow. The first is the relationship of softening point to penetration, that is, a higher softening point for a given penetration indicates higher resistance to flow. Another means is the penetration index which is determined from the softening point and penetration and combined in one empirical factor or index. The data as shown indicate that in all cases where extraneous paraffin plus naphthene and aromatic oil #1 components have been added the resulting asphalt has a higher penetration index than the same asphalt when made to the same softening point by conventional means, such as by air blowing. The asphalts reconstituted in accordance with the invention also have higher penetrations at lower temperatures and lower penetrations at higher temperatures. This is known as improved temperature susceptibility: an advantage in applications such as shingle coating.

One mode of separation which may be used to obtain the desired paraffin plus naphthene and aromatic oil #1 components is as follows: This scheme involves first the separation of asphaltenes by precipitation and filtration using normal hexane as a solvent. The soluble portion called petrolenes is submitted to a chromatographic separation eluting first the paraffin plus naphthene component and then the three aromatic components which are arbitrarily labeled 1, 2 and 3. The aromatic components are successively separated by use of solvents of various displacing power. The paraffin plus naphthene component is removed by eluting with normal heptane and the aromatic oil #1 is eluted with normal heptane plus 10% benzene. Of course, it may be desirable to remove the paraffin plus naphthene component and the aromatic oil #1 component simultaneously. This can be done by using the latter solvent. The various extracted components may be separated from their respective solvents by simple distillation or by flash evaporation.

The modified or reconstituted asphalts described yield much improved results over those prepared by use of selected stocks from conventional refining processes. This is shown in the data to follow.

The base stocks used in the following examples for the three crude sources are characterized as follows:

TABLE III

| Crude | Softening point, ° F. (B and R) | Penetrations at 77° F. (100 g., 5 sec.) |
| --- | --- | --- |
| Tia Juana Medium, Ven. | 258 | 11 |
| Redwater, Can. | 243 | 16 |
| Hawkins, Tex. | 223 | 10 |

*Example I*

400 grams of Tia Juana flux asphalt were mixed with 400 grams of normal hexane. The insoluble portion, asphaltenes, was removed from the solution by filtration. The soluble portion, petrolenes, containing 350 grams of deasphaltened asphalt in normal hexane was then subjected to a chromatographic separation at a temperature from 70–120° F. under atmospheric pressure. A 3" x 10' column filled with 30 pounds of 20–60 mesh dried porocel was used. The paraffin plus naphthenes fraction was subsequently eluted with 25 liters of normal heptane at 2–4 liters/hour. 68 grams of paraffins plus naphthenes were obtained. Subsequently, the aromatic oil #1 component was eluted with 25 liters of solvent composed of 90% heptane and 10% benzene. 62 grams of the aromatic oil #1 were obtained. Each of the components were separated from the porocel as an eluate from which the oils were recovered by stripping off the solvent. The base asphalt derived from a Tia Juana crude was heated 100 to 200° F. above its softening point. The paraffin plus naphthene and aromatic oil #1 components were then added to samples of the base asphalts blown to different softening points. A homogeneous blend was obtained in less than five minutes. The table below shows the flow properties before and after addition of the component.

TABLE IV

| Reconstitution component | Percent added | Percent total | Consistency flow properties | | |
| --- | --- | --- | --- | --- | --- |
| | | | S. P., ° F. | Pen/77° F. | Pen. index |
| | 0 | 16 | 254 | 12 | 5.7 |
| P+N | 10 | 25 | 254 | 24 | 6.8 |
| | 0 | 16 | 212 | 22 | 4.7 |
| P+N | 10 | 23 | 212 | 29 | 5.3 |
| | 0 | 13 | 242 | 16 | 5.6 |
| AO #1 | 10 | 21 | 242 | 23 | 6.3 |
| | 0 | 12 | 223 | 18 | 4.9 |
| AO #1 | 3 | 14½ | 223 | 19 | 5.0 |

The above data conclusively show an increase in both the penetration and penetration index upon the adding of the paraffin plus naphthene and aromatic oil #1 components. Even as little as a 3% addition of the latter component upgraded the product.

*Example II*

In the same manner as described in the previous example a paraffin plus naphthenes (P+N) and aromatic oil #1 (AO #1) components were blended in varying quantities into a Tia Juana Medium Crude. The penetration at 77° F. of these reconstituted asphalts was plotted against the softening point and compared to a flux air blown to specific softening points (norm curve). The results are shown in the figure. It can readily be seen from this figure that the reconstituted asphalts have higher penetrations than air blown asphalts of the same softening point. This graph also shows that the addition of the paraffin plus naphthene component increases the penetration at a greater rate than the aromatic oil #1 component.

*Example III*

Samples were prepared in the same manner as in the previous example with the exception that source of the asphalt was Redwater (Canada) crude. The following results were obtained:

TABLE V

| Reconstitution component | Percent added | Percent total | Consistency flow properties | | |
| --- | --- | --- | --- | --- | --- |
| | | | S. P., ° F. | Pen/77° F. | Pen. index |
| | 0 | 25 | 252 | 14 | 5.8 |
| P+N | 15 | 35 | 252 | 34 | 7.8 |
| | 0 | 25 | 248 | 14 | 5.6 |
| P+N | 5 | 28½ | 248 | 23 | 6.6 |
| | 0 | 16 | 197 | 33 | 4.8 |
| AO #1 | 15 | 27 | 197 | 39 | 5.1 |
| | 0 | 15 | 233 | 18 | 5.4 |
| AO #1 | 5 | 19 | 233 | 23 | 5.8 |

Again it wil lbe noted that the addition of the fractions resulted in an improvement in flow properties. Even the addition of as little as 5% gave marked improvements.

*Example IV*

In this example the component involved and the base asphalt were from a Hawkins, Texas crude. The procedure was essentially the same as in the previous examples,

TABLE VI

| Reconstitution component | Percent added | Percent total | Consistency flow properties | | |
|---|---|---|---|---|---|
| | | | S.P., °F. | Pen/77° F. | Pen. index |
| P+N | 0 | 12 | 209 | 15 | 3.8 |
| | 10 | 20 | 209 | 18 | 4.2 |

While some improvement in flow properties is noted with this asphalt, it was not as significant as that obtained with the asphalts in Examples III and IV. This is due to some inherent differences in the base stocks. However, the same directional effect, namely higher penetrations and higher penetration indices, is demonstrated.

Example V

In order to demonstrate the advantage of blending with the asphalt components disclosed by the invention over blending with conventional refinery streams, the following comparisons are given. Various fractions were added to a base asphalt from a Tia Juana and a Redwater crude. Flow properties, i.e. penetration at 77° F. and penetration index, were measured at given softening points.

TABLE VII

| Crude source | Fraction added | Percent added | Softening point, °F. | Flow properties | |
|---|---|---|---|---|---|
| | | | | Pen/77° F. | P.I. |
| Tia Juana | | | 254 | 12 | 5.7 |
| Do | Deasphalted oil | 10 | 254 | 13 | 5.8 |
| Do | Light distillate | 10 | 254 | 16 | 6.1 |
| Do | Heavy distillate | 10 | 254 | 12 | 5.7 |
| Do | Bright stock raffinate | 10 | 254 | 16 | 6.1 |
| Do | P+N | 10 | 254 | 24 | 6.8 |
| Do | | | 242 | 16 | 5.6 |
| Do | Deasphalted oil | 10 | 242 | 16 | 5.6 |
| Do | Light distillate | 10 | 242 | 18 | 5.8 |
| Do | Heavy distillate | 10 | 242 | 14 | 5.3 |
| Do | Bright stock raffinate | 10 | 242 | 19 | 5.9 |
| Do | AO #1 | 10 | 242 | 23 | 6.3 |
| Do | | | 212 | 22 | 4.7 |
| Do | Deasphalted oil | 10 | 212 | 22 | 4.7 |
| Do | Light distillate | 10 | 212 | 24 | 4.9 |
| Do | Heavy distillate | 10 | 212 | 20 | 4.5 |
| Do | Bright stock raffinate | 10 | 212 | 24 | 4.9 |
| Do | P+N | 10 | 212 | 29 | 5.3 |
| Redwater | | | 252 | 14 | 5.8 |
| Do | Deasphalted oil | 15 | 252 | 24 | 6.8 |
| Do | Light distillate | 15 | 252 | 16 | 6.0 |
| Do | Heavy distillate | 15 | 252 | 17 | 6.1 |
| Do | P+N | 15 | 252 | 34 | 7.8 |

The deasphalted oil used in the test was from a North Louisiana residuum, 26.0° API gravity. The light and heavy distillates are a top cut boiling at 796–986° F. and a heavy cut boiling at 1037°–1063° F. respectively from a Tia Juana flux residuum. The bright stock raffinate is a phenol extract raffinate with 27.8° API gravity and 151 SUS at 210° F.

The above table clearly shows the marked advantage of using the components defined by the invention. The addition of the conventional refinery streams resulted in only slight modification of the flow properties. In some instances these properties were not affected at all or adversely affected.

The above examples are only illustrative of the instant invention and should not be construed as limiting it in any respect.

What is claimed is:

1. A process for improving the flow properties of an asphalt which comprises segregating from a separate asphaltic fraction a hydrocarbon mixture consisting essentially of paraffins, naphthenes with paraffin side chains, single ring aromatics with paraffin side chains and single ring aromatics with attached naphthene rings and blending said mixture with said asphalt, said mixture having a specific gravity at 60/60° F. of not less than about 0.86 and not greater than about 0.95, a Universal Viscosity at 210° F. of not less than about 50 and not greater than about 300, and an initial boiling point of greater than about 800° F.

2. A process in accordance with claim 1 wherein said mixture consists essentially of paraffins and naphthenes with paraffin side chains, has a specific gravity at 60/60° F. in the range of about 0.86 to 0.90, and a Universal Viscosity at 210° F. in the range of about 50 to 125.

3. A process in accordance with claim 1 wherein said mixture is blended with said asphalt in an amount such that said mixture comprises about 3 to 25 weight percent of the resulting blend.

References Cited in the file of this patent

UNITED STATES PATENTS

| | | |
|---|---|---|
| 2,131,205 | Wells et al. | Sept. 27, 1938 |
| 2,201,396 | Fryar | May 21, 1940 |
| 2,701,213 | Neville | Feb. 1, 1955 |
| 2,822,282 | Garwin | Feb. 4, 1958 |
| 2,904,494 | Griffin | Sept. 15, 1959 |
| 2,913,389 | Heithaus | Nov. 17, 1959 |